March 5, 1957 W. L. STACE ET AL 2,784,002
FLUID-ACTUATED CHUCK
Filed May 10, 1954 2 Sheets-Sheet 1

INVENTORS.
WALTER L. STACE and
JOSEPH S. ALLEN,
BY:
Harold B. Hood
ATTORNEY.

March 5, 1957 W. L. STACE ET AL 2,784,002
FLUID-ACTUATED CHUCK
Filed May 10, 1954

INVENTORS.
WALTER L. STACE and
BY: JOSEPH S. ALLEN,

Harold B Hood
ATTORNEY.

United States Patent Office 2,784,002
Patented Mar. 5, 1957

2,784,002

FLUID-ACTUATED CHUCK

Walter L. Stace and Joseph S. Allen, Indianapolis, Ind.

Application May 10, 1954, Serial No. 428,671

10 Claims. (Cl. 279—4)

The present invention relates to chucks, and particularly to that type chuck having a plurality of radially movable, work-engaging fingers; and has, as its primary object, the provision of fluid actuated means for effecting radial movement of said fingers into and out of engagement with a work-piece.

A further object is to provide such a chuck in which the fingers thereof are radially movable either toward or away from the axis of the chuck in response to axial movement in one direction of a fluid piston constituting an integral part of the chuck.

Another object is to provide means for controlling the direction of movement of the chuck fingers when the fluid piston is moved in said one direction, such means being readily adjustable to reverse such finger movement.

Further objects will become apparent as the description proceeds.

To the accomplishment of the above and related objects, our invention may be embodied in the forms illustrated in the accompanying drawings, attention being called to the fact, however, that the drawings are illustrative only, and that change may be made in the specific constructions illustrated and described, so long as the scope of the appended claims is not violated.

Fig. 5 is a sectional view, similar to that of Fig. 2, but showing a modified form of our chuck;

Figure 1:
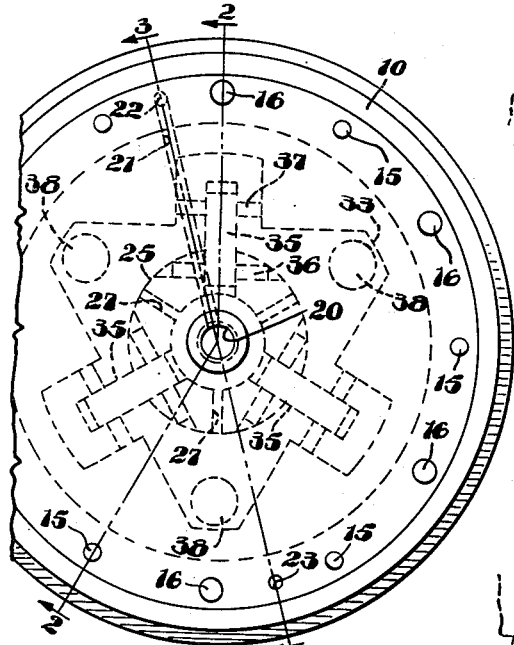
Fig. 1 is a rear elevation of a chuck constructed in accordance with our invention.

Referring more particularly to the drawings, and especially to Figs. 1 through 4, we have shown our chuck as comprising a base 10 formed to provide a cylinder 11 opening through one end 12 of said base. A piston 13 is reciprocably received in cylinder 11 and a back plate 14 is fixed to base 10, by means of a plurality of screws 15 or the like, to close the cylinder 11. A plurality of screws 16 is provided for fixing the chuck to a lathe face-plate or the like, indicated in dotted lines at 17 in Fig. 2.

Base 10 is provided with a first passage 18 opening through the end 12 of base 10 and communicating with cylinder 11 on one side of piston 13. Said base is provided with a second passage 19 opening through end 12 and communicating with cylinder 11 on the opposite side of piston 13. Back plate 14 is provided, preferably near its center, with a tapped bore 20. A further bore 21 communicates with bore 20 and extends radially therefrom. A bore 22 communicates with bore 21 near the periphery of back plate 14 and registers with the passage 18 opening through end 12 of base 10. A further bore 23 is provided in back plate 14 and registers at one end with passage 19 in base 10 and opens at the other end to the atmosphere.

Figure 3:
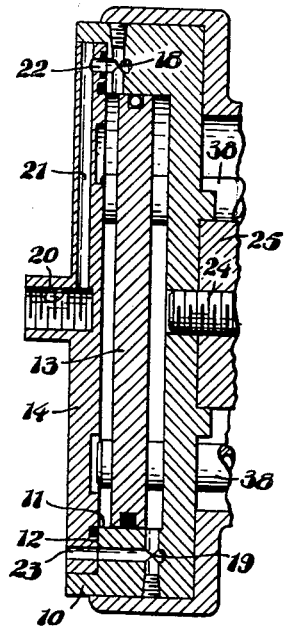
Fig. 3 is a partial sectional view taken substantially on line 3—3 of Fig. 1 and showing the details of the fluid control passages for conducting fluid under pressure to the cylinder in the chuck.
Figure 4:
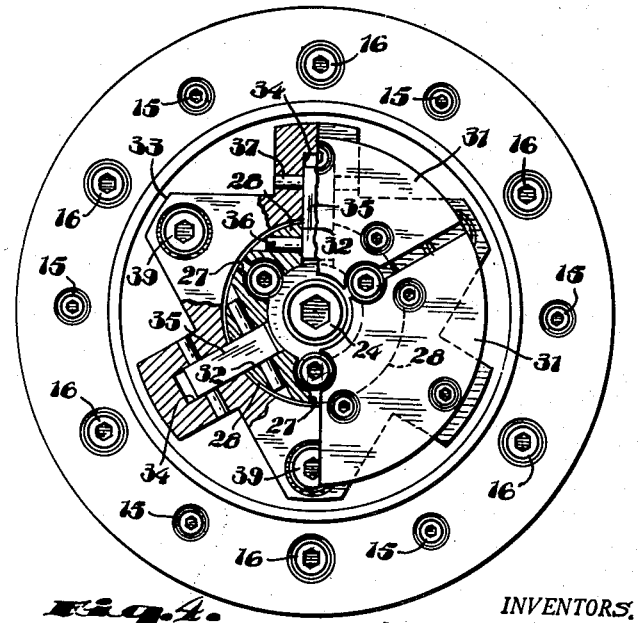
Fig. 4 is a front elevation of our chuck, taken partially in section substantially on line 4—4 of Fig. 2.

The tapped bore 20 is adapted to be connected to a source of fluid under pressure. As illustrated in Fig. 3, when the fluid is admitted through bores 20, 21 and 22, it will pass through passage 18 into cylinder 11 forcing the piston 13 to the right. Air on the right hand side of piston 13 will be exhausted to the atmosphere through passage 19 and bore 23. By removing screws 15, back plate 14 can be rotated through 180° to bring bore 22 into registry with passage 19, and to bring bore 23 into registry with passage 18. Thus, when fluid is admitted through bore 20, it will be delivered through passage 19 to the right hand side of piston 13 to move said piston to the left. The direction of movement of piston 13 in response to fluid under pressure supplied through bore 20 from a source is, thereby, easily controlled according to the job to which the chuck is presently being put.

Fixed to the end of base 10 remote from end 12 we provide a tubular member 25. Said member may be fixed to base 10 by means of screws 24 or the like. Tubular member 25 is provided with a radially-extending, peripheral flange 26 on its distal end, and is provided with a plurality of axially-extending slots 27 defining a plurality of fingers 28 each having a radially-extending toe 30. The member 25 is formed of a material such that the fingers 28 are resiliently movable toward and away from the axis of member 25.

Each toe 30 is provided with a block 31 which may be machined around its outer periphery to fit the internal surface of a work-piece. Alternatively, such blocks may be machined along the axis of member 25 to grip the outer periphery of a work-piece. This, of course, will depend upon the particular shape of the work-piece to be held by the chuck.

An annular collar 33 surrounds the member 25. Each of the fingers 28 is provided with an axially extending slot 32 and the collar 33 is provided with a radial slot 34 registering with each of the slots 32. A link 35 is arranged in each of the mating slots 32, 34 and is pivoted respectively to a finger 28 and the collar 33 by means of pins 36 and 37.

It will be noted that the links 35 are inclined slightly in a common direction from a plane perpendicular to the axis of the member 25.

A plurality of posts 38 is arranged about member 25 and each is fixed at one end to piston 13, by means of a screw 39 or the like, and at the other end to the collar 33, by means of a screw 40 or the like. Thus, the collar 33 is rigidly fixed to piston 13 for movement in response to movement of said piston.

Figure 2:
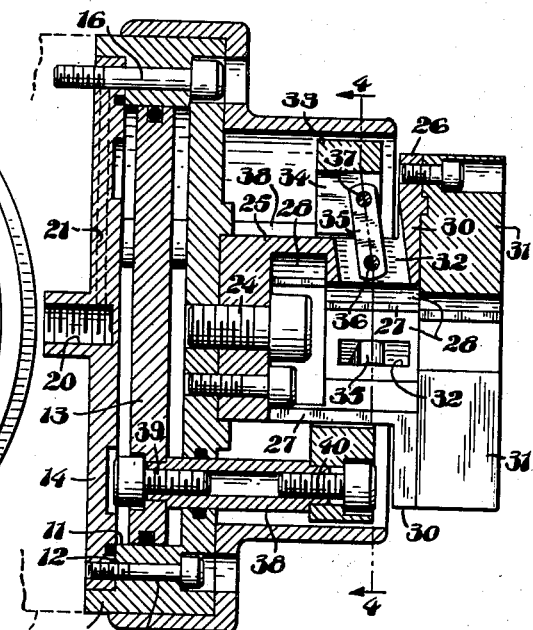
Fig. 2 is a longitudinal sectional view taken substantially on line 2—2 of Fig. 1 and showing the internal construction of the chuck.

With back plate 14 in its position illustrated in Fig. 3, fluid pressure admitted through bore 20 will force piston 13 to the right. Collar 33 will thereby be forced to the right swinging the outer end of each link 35 in a direction which is clockwise as seen in Fig. 2. This will cause the fingers 28 to move toward the axis of member 25 thereby gripping a work-piece inserted between the blocks 31. If, as explained above, back plate 14 is rotated through 180°, fluid admitted through bore 20 will pass through passage 19 and drive piston 13 to the left, as illustrated in Fig. 3. This will move collar 33 to the left causing links 35 to swing in an opposite direction about pins 36 thereby causing the blocks 31 to move radially outwardly to grip a work-piece sleeved over the outer periphery of blocks 31.

Figure 6:
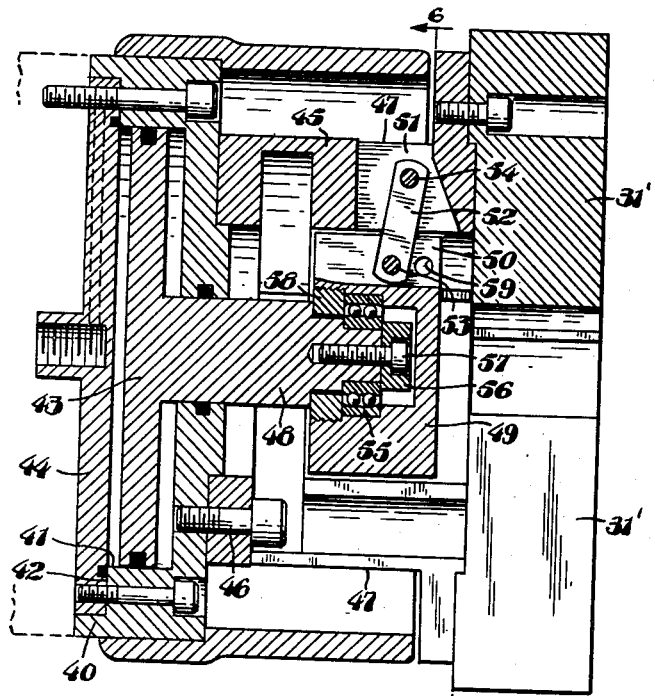
Fig. 6 is a front elevation of the chuck of Fig. 5, taken partially in section substantially on line 6—6 of Fig. 5.
Figure 7:
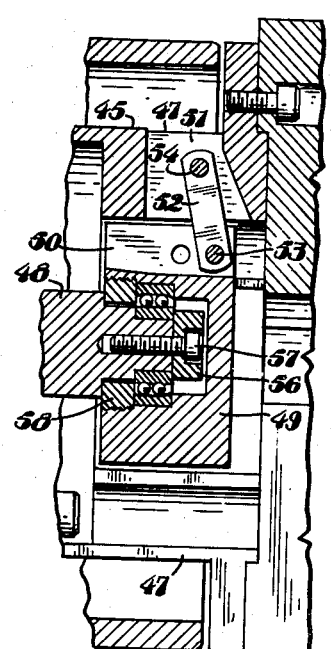
Fig. 7 is a fragmentary sectional view of a portion of Fig. 5 but showing the finger-actuating links in a position for effecting reverse movement of such fingers.
Figure 6:
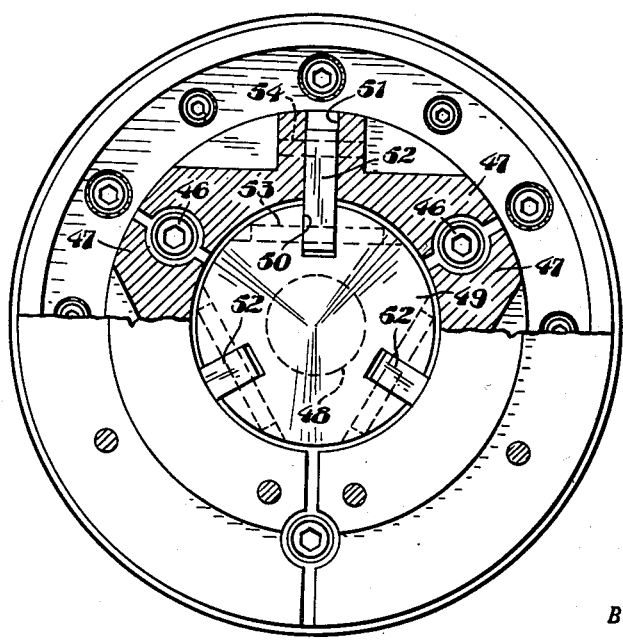

In Figs. 5 through 7, we have illustrated a modified form of our invention in which the base 40 is provided with a cylinder 41 opening through one end 42 thereof. A piston 43 is reciprocably received in cylinder 41 and a back plate 44, which may be similar to back plate 14, is fixed to base 40 to close cylinder 41.

A tubular member 45, functionally similar to member 25, is fixed to base 40 by means of screws 46 or the like. Member 45 is axially slotted to provide a plurality of resiliently radially flexible fingers 47.

A stem 48 is fixed to piston 43 and extends axially therefrom in the direction opposite back plate 44. A disc element 49 is secured to the distal end of stem 48, and is provided with a plurality of axially extending slots 50 registering with a like plurality of slots 51 in the fingers 47. Pins 53 and 54 traverse the slots 50 and 51 respectively to provide pivotal mountings for links 52. Here again, it will be noted that the links 52 are inclined in a common direction from a plane perpendicular to the axis of stem 48. Thus, if piston 43 is moved to the right, the links 52 will be swung about pin 54, in a direction which is counter-clockwise as seen in Fig. 5, forcing the fingers 47 radially outwardly to move blocks 31' into engagement with a work-piece slipped over said blocks.

We prefer to fix the disc element 49 to the end of stem 48 through the medium of a washer 56 gripping a self-aligning bearing 55 and held in place by means of a screw 57. Said bearing, in turn, retains a collar 58 which is keyed upon stem 48; and the element 49 is then threaded upon the outer periphery of collar 58.

As said before, the back plate 44 may be similar to plate 14 whereby the direction of movement of piston 43, and thereby movement of fingers 47, can be controlled by the proper positioning of back plate 44 relative to the passages 18 and 19. Another, though less facile, method of controlling the direction of movement of fingers 47, is to reverse the inclination of the links 52. (See Fig. 7.) This may be done by providing a second bore 59, for the reception of pin 53, across each of the slots 50. By removing pin 53 and swinging link 52 about pin 54, in a direction which is counter-clockwise as seen in Fig. 5, and by placing pin 53 through bore 59, movement of piston 43 to the right, as viewed in Fig. 7, will cause the fingers 47 to move radially inwardly. Alternatively, of course, a pair of interchangeable discs 49 could be provided—a shorter one having only the bores necessary for obtaining the positions of links 52 shown in Fig. 5, and a longer one having only the bores 59 for obtaining the positions of links 52 shown in Fig. 7.

We claim as our invention:

1. A chuck comprising a base, a plurality of finger means radially arranged about the axis of said base and supported therefrom for radial movement relative to said base axis, actuator means mounted for movement relative to said finger means substantially in line with said base axis, link means for each of said finger means and each having one end pivotally secured to its finger and the other end pivotally secured to said actuator means, said base being formed to provide a cylinder substantially coaxial with said base axis, a piston arranged for reciprocation in said cylinder, and means providing a rigid connection between said piston and said actuator means.

2. The chuck of claim 1 in which the cylinder formed in said base opens through the end thereof remote from said finger means, said base being formed further with a first passage opening through said remote base end and communicating with said cylinder on one side of said piston, and with a second passage opening through said remote base end and communicating with said cylinder on the opposite side of said piston, and including a back plate removably secured to said remote base end to close said cylinder and to overlie the ends of the two said passages opening through said remote base end, said back plate being formed with a first bore adapted for connection to a source of fluid under pressure and registering with one of said passages to conduct such fluid to said cylinder on one side of said piston, and with a second bore registering with the other of said passages and opening to the atmosphere.

3. The chuck of claim 2 in which the two said passages are substantially equidistantly spaced from the axis of said cylinder at points substantially 180° removed from each other and the two said bores are similarly arranged in said back plate, said back plate being rotatably adjustable through 180° to disconnect said fluid source from said one side of said piston and to connect it to the opposite side thereof.

4. A chuck comprising a base, a plurality of finger means fixed to said base and extending axially therefrom in radial arrangement about the axis of said base, said finger means being resiliently radially flexible relative to the axis of said base, actuator means supported adjacent said finger means for axial movement relative thereto, a link for each of said finger means and each having one end pivotally secured to its finger and the other end pivotally secured to said actuator means, said base being formed to provide a cylinder substantially coaxial with the axis of said base, a piston arranged for reciprocation in said cylinder, and means providing a rigid connection between said piston and said actuator means.

5. The chuck of claim 4 in which said actuator means comprises an annular collar surrounding said plurality of finger means, and the last-mentioned means comprises a plurality of posts radially arranged about the axis of said base substantially parallel thereto, said posts each being fixed at one end to said piston and at the other end to said collar.

6. The chuck of claim 4 in which said actuator means comprises a disc substantially centrally arranged relative to said plurality of finger means, and the last-mentioned means comprises a stem projecting axially from said piston, said disc being secured to the remote end of said stem for movement therewith.

7. The chuck of claim 6 in which said links are each inclined in a common direction relative to a plane perpendicular to the axis of said stem, whereby actuation of said piston will cause said finger means to move radially in one direction relative to the axis of said stem, and including means for rearranging said links so that they are each inclined in the opposite direction relative to said plane, whereby such actuation of said piston will cause said finger means to move radially in the opposite direction relative to the axis of said stem.

8. A chuck comprising a base formed to provide a cylinder opening through one end thereof, a back plate, means for releasably fixing said back plate to said one end of said base to close the open end of said cylinder, a piston arranged for reciprocation in said cylinder, said base being formed further with a first passage opening through said one end of said base and communicating with said cylinder on one side of said piston, and with a second passage opening through said one base end, at a point substantially 180° removed from said first passage, and communicating with said cylinder on the opposite side of said piston, said back plate being proportioned to overlie the open ends of the two said passages and formed with a first bore adapted for connection with a source of fluid under pressure and registering with said first passage to connect said fluid source to said one side of said piston, and with a second bore registering with said second passage and opening to the atmosphere, said back plate being adjustably rotatable through 180° to disconnect said fluid source from said one side of said piston and to connect it to the opposite side thereof, a plurality of radially resiliently flexible fingers supported on said base about the axis of said cylinder and projecting axially from said base in the direction opposite said one end thereof, an annular collar surrounding said plurality of fingers, a plurality of posts radially arranged and axially extending relative to the axis of said cylinder, said posts each being fixed at one end to said piston and at the opposite end to said collar for movement of said collar in response to movement of said piston, and a link for each of said fingers each pivotally connected at one end to its finger and at the other end to said collar, said links each being similarly inclined in a common direction relative to a plane perpendicular to the axis of said cylinder.

9. A chuck comprising a base formed to provide a cylinder opening through one end thereof, a back plate, means for releasably fixing said back plate to said one end of said base to close the open end of said cylinder, a piston arranged for reciprocation in said cylinder, said base being formed further with a first passage opening through said one end of said base and communicating with said cylinder on one side of said piston, and with a second passage opening through said one base end, at a point substantially 180° removed from said first passage, and communicating with said cylinder on the opposite side of said piston, said back plate being proportioned to overlie the open ends of the two said passages and formed with a first bore adapted for connection with a source of fluid under pressure and registering with said first passage to connect said fluid source to said one side of said piston, and with a second bore registering with said second passage and opening to the atmosphere, said back plate being adjustably rotatable through 180° to disconnect said fluid source from said one side of said piston and to connect it to the opposite side thereof, a plurality of radially resiliently flexible fingers supported on said base about the axis of said cylinder and projecting axially from said base in the direction opposite said one end thereof, a stem projecting axially from said piston in the direction away from said back plate, a link for each of said fingers, means providing a pivotal connection between one end of each link and its finger, and means providing a pivotal connection between the opposite end of each said link and the distal end of said stem, said links being similarly inclined in a common direction relative to a plane perpendicular to the axis of said stem.

10. The chuck of claim 9 in which the last-mentioned means comprises a disc member fixed to the distal end of said stem and formed with an axially-extending peripheral slot for each of said links, and a pivot pin traversing each slot for pivotal engagement with the end of the respective links.

References Cited in the file of this patent

UNITED STATES PATENTS

| | | |
|---|---|---|
| 512,283 | Elliott | Jan. 9, 1894 |
| 2,297,922 | Sloan et al. | Oct. 6, 1942 |
| 2,457,909 | McKay et al. | Jan. 4, 1949 |
| 2,464,507 | Howart et al. | Mar. 15, 1949 |